(12) United States Patent
Kimura (10) Patent No.: US 11,867,235 B2
(45) Date of Patent: Jan. 9, 2024

(54) PLUMMER BLOCK

(71) Applicant: NTN Corporation, Osaka (JP)

(72) Inventor: Daigo Kimura, Kuwana (JP)

(73) Assignee: NTN Corporation, Osaka (JP)

( * ) Notice: Subject to any disclaimer, the term of this patent is extended or adjusted under 35 U.S.C. 154(b) by 8 days.

(21) Appl. No.: 17/675,706

(22) Filed: Feb. 18, 2022

(65) Prior Publication Data

US 2022/0268318 A1  Aug. 25, 2022

(30) Foreign Application Priority Data

Feb. 22, 2021 (JP) ................................. 2021-026141

(51) Int. Cl.
 *F16C 35/04* (2006.01)
(52) U.S. Cl.
 CPC .................................. *F16C 35/047* (2013.01)
(58) Field of Classification Search
 CPC ........................... F16C 9/02; F16C 35/04–047
 See application file for complete search history.

(56) References Cited

U.S. PATENT DOCUMENTS

| | | | | |
|---|---|---|---|---|
| 2,620,244 A * | 12/1952 | Beatty, Jr. | ............. | F16C 35/047 384/498 |
| 3,291,541 A * | 12/1966 | Dellinger | ................ | F16C 23/08 432/104 |
| 3,476,450 A * | 11/1969 | Savage | ................. | F16C 35/047 384/434 |
| 3,484,142 A * | 12/1969 | Noboru | ................... | F16B 21/16 384/434 |
| 4,183,590 A * | 1/1980 | Lower | ..................... | F16C 35/02 403/114 |
| 2020/0047612 A1 * | 2/2020 | McLaughlin | ......... | F16C 35/047 |

FOREIGN PATENT DOCUMENTS

| | | |
|---|---|---|
| JP | 2009-079693 A | 4/2009 |
| WO | WO-2016162093 A1 * | 10/2016 ............ F16C 35/047 |

* cited by examiner

*Primary Examiner* — Alan B Waits
(74) *Attorney, Agent, or Firm* — Rimon P.C.; Tomoki Tanida (57) ABSTRACT

A plummer block includes a bearing and a bearing housing that accommodates and supports the bearing. The bearing housing includes an upper housing portion and a lower housing portion that is separate from the upper housing portion. The upper housing portion has a first surface facing downward. The lower housing portion has a second surface facing upward. The first surface has: a contact region in contact with the second surface; and a first protruding region protruding from the contact region at least outward in a radial direction of the bearing when viewed in the up-down direction.

18 Claims, 2 Drawing Sheets

PLUMMER BLOCK

CROSS REFERENCE TO RELATED APPLICATIONS

This application claims the priority of Japanese Application No. 2021-026141, filed on Feb. 22, 2021, the entire disclosure of which is incorporated by reference herein.

BACKGROUND OF THE INVENTION

Field of the Invention

The present invention relates to a plummer block.

Description of the Background Art

A plummer block including a bearing and a bearing housing that supports the bearing has been known.

Japanese Patent Laying-Open No. 2009-079693 discloses a plummer block vertically divided into two blocks, i.e., an upper plummer block and a lower plummer block. The lower surface of the upper plummer block is in contact with the upper surface of the lower plummer block.

SUMMARY OF THE INVENTION

In the plummer block disclosed in Japanese Patent Laying-Open No. 2009-079693, the entire lower surface of the upper plummer block is disposed to overlap with the upper surface of the lower plummer block when viewed in the up-down direction. In such a plummer block, liquid such as rainwater may pass through between the lower surface of the upper plummer block and the upper surface of the lower plummer block, and then, may enter the inside of the plummer block from outside. As a result, the inside of the plummer block may get corroded.

A main object of the present invention is to provide a plummer block whose inside is less likely to get corroded as compared with the above-mentioned plummer block.

A plummer block according to an embodiment of the present invention includes a bearing and a bearing housing that accommodates and supports the bearing. The bearing housing includes an upper housing portion and a lower housing portion that is separate from the upper housing portion. The upper housing portion has a first surface facing downward. The lower housing portion has a second surface facing upward. The first surface has: a contact region in contact with the second surface; and a first protruding region protruding from the contact region at least outward in a radial direction of the bearing when viewed in an up-down direction.

A maximum width R1 of the first surface in the radial direction is greater than a width R2 of the second surface in the radial direction at a position in an axial direction of the bearing where maximum width R1 is measured. Preferably, a difference (R1−R2) between maximum width R1 and width R2 is 2% or more and 15% or less of maximum width R1.

Preferably, when viewed in the up-down direction, the first protruding region is disposed outside the contact region in the radial direction and the axial direction. Preferably, a maximum width r1 of the first surface in the axial direction is greater than a width r2 of the second surface in the axial direction at a position in the radial direction where maximum width r1 is measured.

Preferably, a difference (R1−R2) between maximum width R1 and width R2 is greater than a difference (r1−r2) between maximum width r1 and width r2.

In the plummer block, the upper housing portion further includes a first recessed surface disposed between the pair of first surfaces in the radial direction and recessed relative to the pair of first surfaces. The lower housing portion further includes a second recessed surface disposed between the pair of second surfaces in the radial direction and recessed relative to the pair of second surfaces. Preferably, the first recessed surface has: a facing region facing the second recessed surface; and a second protruding region protruding from the facing region at least outward in the axial direction of the bearing when viewed in the up-down direction. Preferably, the second protruding region is contiguous to the first protruding region.

In the plummer block, when viewed in the up-down direction, a ratio of: a width of the first protruding region in the radial direction located on one side with respect to the bearing in the radial direction to; a width of the first protruding region in the radial direction located on the other side with respect to the bearing in the radial direction may be 0.9 or more and 1.1 or less.

In the plummer block, when viewed in the up-down direction, a ratio of: a width of the first protruding region in the axial direction located on one side with respect to the bearing in the axial direction to; a width of the first protruding region in the axial direction located on the other side with respect to the bearing in the axial direction may be 0.9 or more and 1.1 or less.

Preferably, the bearing housing further includes: a protrusion protruding in the up-down direction from one of the first surface and the second surface; and a recess recessed relative to the other of the first surface and the second surface and fitted to the protrusion. The protrusion may be a part of a spherical member.

Preferably, the bearing housing further includes: a protrusion protruding in the up-down direction from one of the first surface and the second surface; and a recess recessed relative to the other of the first surface and the second surface and fitted to the protrusion. The protrusion may be a part of a rod-shaped member.

A remaining part of the rod-shaped member may be embedded in the upper housing portion or the lower housing portion. An outer shape of the rod-shaped member along a cross section perpendicular to the up-down direction may be circular. In this case, preferably, an outer diameter D of the rod-shaped member along the cross section and a total length A of the rod-shaped member in the up-down direction satisfy a relational expression of 1.5 D≤A≤2.5 D.

Preferably, a ratio of a length B of the protrusion in the up-down direction to total length A of the rod-shaped member in the up-down direction is 22% or more and 28% or less.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the accompanying drawings, in which the same or corresponding portions are denoted by the same reference characters, and the description thereof will not be repeated.

<Configuration of Plummer Block 100>

Figure 1:
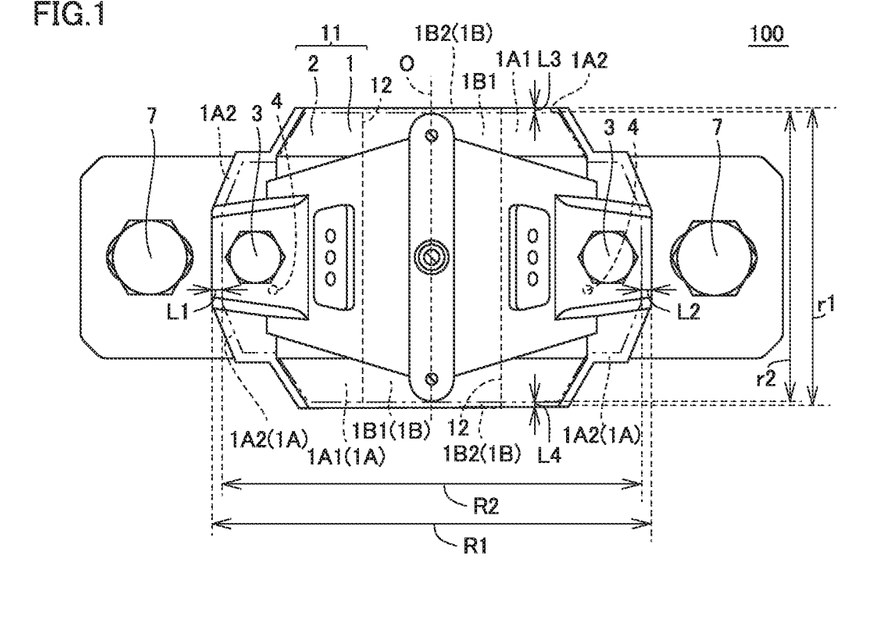
FIG. 1 is a plan view of a plummer block according to the present embodiment.
Figure 2:
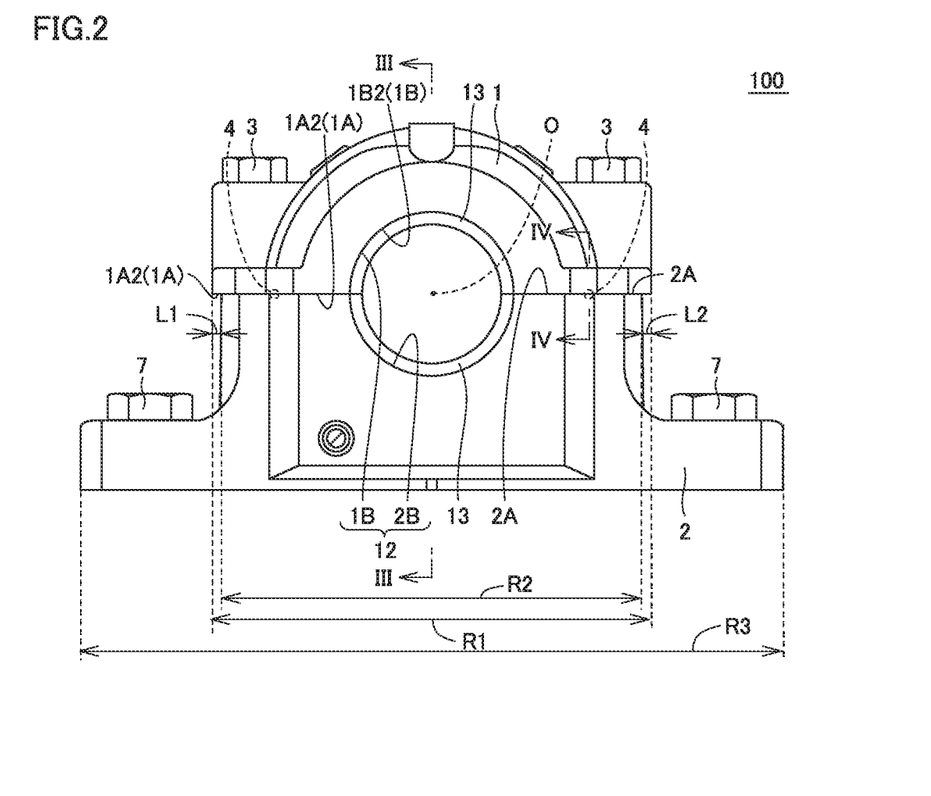
FIG. 2 is a front view of the plummer block shown in FIG. 1.
Figure 3:
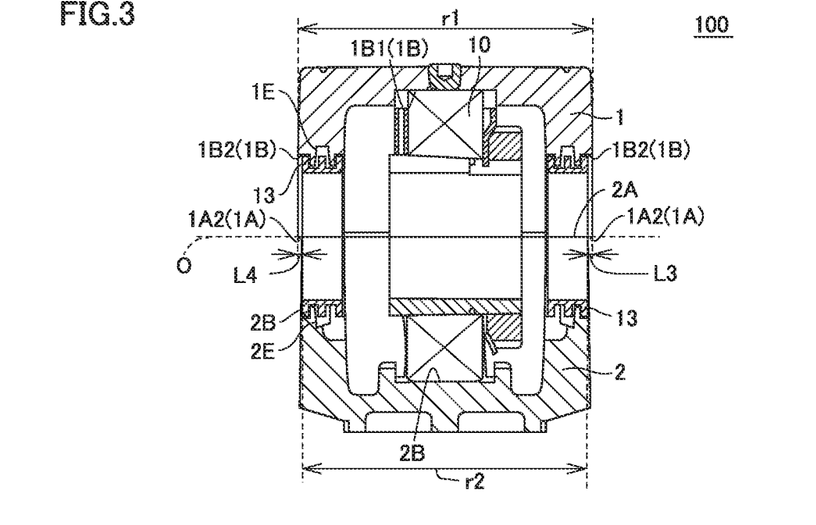
FIG. 3 is a cross-sectional view taken along an arrow III-III in FIG. 2.

FIGS. 1 to 4 each show a plummer block 100 according to one embodiment of the present invention. As shown in FIGS. 1 to 3, plummer block 100 mainly includes a bearing 10, a bearing housing 11, and a plurality of seal members 13.

Bearing 10 supports a rotational shaft (not shown). Bearing 10 is, for example, a rolling bearing or a ball bearing. Note that bearing 10 may be a roller bearing. FIGS. 1 to 3 each show a central axis line O of the rotational shaft supported by bearing 10. The axial direction of bearing 10, i.e., the direction in which central axis line O extends, intersects with (for example, is orthogonal to) the up-down direction. In other words, the axial direction of bearing 10 extends in the horizontal direction, for example. In the following description, the axial direction of bearing 10 will be simply referred to as an axial direction, and the radial direction of bearing 10 will be simply referred to as a radial direction.

Bearing housing 11 accommodates and supports bearing 10. As shown in FIGS. 1 to 3, bearing housing 11 includes: an upper housing portion 1; a lower housing portion 2 that is separate from upper housing portion 1; and a plurality of fixing portions 3 for fixing upper housing portion 1 to lower housing portion 2.

Each of upper housing portion 1 and lower housing portion 2 has a structure in which a cylindrical member is divided into halves. Bearing housing 11 is obtained in an assembly operation of fixing upper housing portion 1 to lower housing portion 2 with fixing portions 3. Bearing housing 11 is provided with a through hole 12 through which the rotational shaft passes. Through hole 12 extends in the axial direction from one end to the other end of bearing housing 11 in the axial direction.

Upper housing portion 1 has: a pair of first surfaces 1A facing downward and located at a distance from each other in the radial direction; and a first recessed surface 1B recessed relative to the pair of first surfaces 1A. Each first surface 1A is, for example, a flat plane extending along central axis line O. When viewed in the up-down direction, the pair of first surfaces 1A is disposed such that first recessed surface 1B is sandwiched therebetween in the radial direction. When viewed in the up-down direction, first recessed surface 1B is disposed in a central area of upper housing portion 1 in the radial direction. First recessed surface 1B extends in the axial direction from one end to the other end of upper housing portion 1 in the axial direction.

The inner peripheral end of each first surface 1A in the radial direction is connected to the outer peripheral end of first recessed surface 1B in the radial direction. Both ends of each first surface 1A in the axial direction are respectively contiguous in the radial direction to both ends of first recessed surface 1B in the axial direction.

Lower housing portion 2 has: a pair of second surfaces 2A facing upward and located at a distance from each other in the radial direction; and a second recessed surface 2B recessed relative to the pair of second surfaces 2A. Each second surface 2A is, for example, a flat plane extending along central axis line O. When viewed in the up-down direction, the pair of second surfaces 2A is disposed such that second recessed surface 2B is sandwiched therebetween in the radial direction. When viewed in the up-down direction, second recessed surface 2B is disposed in a central area of lower housing portion 2 in the radial direction. Second recessed surface 2B extends in the axial direction from one end to the other end of lower housing portion 2 in the axial direction.

The inner peripheral end of each second surface 2A in the radial direction is connected to the outer peripheral end of second recessed surface 2B in the radial direction. Both ends of each second surface 2A in the axial direction are respectively contiguous in the radial direction to both ends of second recessed surface 2B in the axial direction.

The plurality of fixing portions 3 each may have any structure as long as they can fix upper housing portion 1 to lower housing portion 2, and each may be a fastening bolt, for example. Upper housing portion 1 is provided with a through hole through which each fixing portion 3 is inserted. Lower housing portion 2 is provided with a plurality of bolt holes through which respective fixing portions 3 are fastened.

The number of fixing portions 3 is not particularly limited but may be two, for example. Fixing portions 3 are disposed, for example, such that central axis line O is sandwiched therebetween in the radial direction. Each of fixing portions 3 is disposed so as not to overlap with first recessed surface 1B and second recessed surface 2B when viewed in the up-down direction.

Plummer block 100 is fixed to an external structure with a plurality of fixing portions 7. Lower housing portion 2 is provided with through holes through which respective fixing portions 7 pass. The plurality of fixing portions 7 each may have any structure as long as they can fix plummer block 100 to the external structure, and each may be a fastening bolt, for example.

<Specific Configuration of Bearing Housing 11>

As shown in FIGS. 1 to 3, the pair of first surfaces 1A each have the same configuration. The pair of second surfaces 2A each have the same configuration. Each first surface 1A has a contact region 1A1 and a first protruding region 1A2.

Contact region 1A1 is in contact with each of the pair of second surfaces 2A in bearing housing 11. In other words, each of contact regions 1A1 of the paired first surfaces 1A and a corresponding one of the paired second surfaces 2A are configured as what is called mating surfaces that face each other. First protruding region 1A2 is not in contact with the pair of second surfaces 2A but is exposed to the outside of lower housing portion 2 and faces downward.

Contact region 1A1 is disposed so as to surround bearing 10 when viewed in the up-down direction. The inner peripheral end of contact region 1A1 in the radial direction forms the inner peripheral end of each first surface 1A in the radial direction, and is connected to the outer peripheral end of first recessed surface 1B in the radial direction.

When viewed in the up-down direction, first protruding region 1A2 protrudes outward from contact region 1A1 in each of the radial direction and the axial direction. First protruding region 1A2 has: an inner peripheral edge connected to the outer peripheral edge of contact region 1A1; and an outer peripheral edge located at a distance from the inner peripheral edge.

For example, when viewed in the up-down direction, first protruding region 1A2 is disposed so as to surround the entire periphery of contact region 1A1 excluding the inner peripheral end of contact region 1A1 in the radial direction. In other words, first protruding region 1A2 is disposed so as to surround the outer peripheral edge of contact region 1A1. The outer peripheral edge of contact region 1A1 extends from one end of contact region 1A1 in the axial direction through the outer peripheral end of contact region 1A1 in the radial direction to the other end of contact region 1A1 in the axial direction.

As shown in FIGS. 1 and 2, a maximum width R1 of the pair of first surfaces 1A in the radial direction is greater than a width R2 of the pair of second surfaces 2A in the radial direction at a position in the axial direction where maximum width R1 is measured. A difference (R1−R2) between maximum width R1 and width R2 is 2% or more and 15% or less of maximum width R1.

Maximum width R1 is measured, for example, in a central area of bearing housing 11 in the axial direction. Maximum width R1 represents the longest distance in the radial direction between: the outer peripheral end in the radial direction of first protruding region 1A2 of one first surface 1A of the pair of first surfaces 1A; and the outer peripheral end in the radial direction of first protruding region 1A2 of the other first surface 1A of the pair of first surfaces 1A.

Width R2 represents a distance in the radial direction, at the position in the axial direction where maximum width R1 is measured, between the outer peripheral end in the radial direction of one second surface 2A of the pair of second surfaces 2A and the outer peripheral end in the radial direction of the other second surface 2A of the pair of second surfaces 2A. In other words, width R2 represents a distance in the radial direction, at the position in the axial direction where maximum width R1 is measured, between the inner peripheral end in the radial direction of first protruding region 1A2 of one first surface 1A of the pair of first surfaces 1A and the inner peripheral end in the radial direction of first protruding region 1A2 of the other first surface 1A of the pair of first surfaces 1A. Maximum width R1 is equal to or less than maximum width R3 (see FIG. 2) of lower housing portion 2 in the radial direction.

Preferably, a ratio L2/L1 of a maximum width L2 to a maximum width L1 is 0.9 or more and 1.1 or less, where maximum width L1 (the distance in the radial direction between the outer peripheral edge and the inner peripheral edge of first protruding region 1A2) represents a maximum width of first protruding region 1A2 in the radial direction located on one side with respect to central axis line O, and maximum width L2 represents a maximum width of first protruding region 1A2 in the radial direction located on the other side with respect to central axis line O. Each of maximum widths L1 and L2 is, for example, 1% or more and 8% or less of maximum width R1. The ratio L2/L1 is preferably 0.95 or more and 1.05 or less. Maximum widths L1 and L2 each are 3 mm or more and 6 mm or less, for example.

As shown in FIG. 1, a maximum width r1 of the pair of first surfaces 1A in the axial direction is greater than a width r2 of the pair of second surfaces 2A in the axial direction at the position in the radial direction where maximum width r1 is measured.

Maximum width r1 represents the longest distance in the axial direction between: the outer peripheral edge of first protruding region 1A2 located on one side with respect to bearing 10 in the axial direction; and the outer peripheral edge of first protruding region 1A2 located on the other side with respect to bearing 10 in the axial direction.

Width r2 represents a distance in the axial direction between: the inner peripheral edge of first protruding region 1A2 located on one side with respect to bearing 10 in the axial direction; and the inner peripheral edge of first protruding region 1A2 located on the other side with respect to bearing 10 in the axial direction.

Preferably, a ratio L4/L3 of a maximum width L4 to a maximum width L3 is 0.9 or more and 1.1 or less, where maximum width L3 (the distance in the axial direction between the outer peripheral edge and the inner peripheral edge) represents a maximum width of first protruding region 1A2 in the axial direction located on one side with respect to bearing 10 in the axial direction, and maximum width L4 represents a maximum width of first protruding region 1A2 in the axial direction located on the other side with respect to bearing 10 in the axial direction. The ratio L4/L3 is preferably 0.95 or more and 1.05 or less. The ratio L4/L3 is 1, for example. Maximum widths L3 and L4 each are 1 mm or more and 4 mm or less, for example.

The difference (R1−R2) between maximum width R1 and width R2 in the radial direction is greater than the difference (r1−r2) between maximum width r1 and width r2 in the axial direction. In other words, the sum of maximum widths L1 and L2 of first protruding region 1A2 in the radial direction is greater than the sum of maximum widths L3 and L4 of first protruding region 1A2 in the axial direction.

As shown in FIGS. 1 to 3, first recessed surface 1B extends in the axial direction from one end to the other end of upper housing portion 1 in the axial direction. Second recessed surface 2B extends in the axial direction from one end to the other end of lower housing portion 2 in the axial direction.

First recessed surface 1B has a facing region 1B1 and a pair of second protruding regions 1B2. Facing region 1B1 faces second recessed surface 2B in the up-down direction in bearing housing 11. Specifically, facing region 1B1 and second recessed surface 2B constitute an inner space in bearing housing 11 such that bearing 10 and seal member 13 are accommodated in the inner space. The outer peripheral end of facing region 1B1 in the radial direction forms the outer peripheral end of first recessed surface 1B in the radial direction and is connected to the inner peripheral end of each first surface 1A in the radial direction (that is, connected to the inner peripheral end of contact region 1A1 in the radial direction).

The paired second protruding regions 1B2 protrude outward respectively from one end and the other end of facing region 1B1 in the axial direction when viewed in the up-down direction. Each second protruding region 1B2 has: an inner peripheral edge connected to one end or the other end of facing region 1B1 in the axial direction; and an outer peripheral edge located at a distance from the inner peripheral edge.

Each second protruding region 1B2 is contiguous to each first protruding region 1A2. The outer peripheral end of each second protruding region 1B2 in the radial direction is connected to the inner peripheral end of each first protruding region 1A2 in the radial direction. First protruding regions 1A2 of the pair of first surfaces 1A are disposed annularly so as to surround the entire outer peripheral edge of lower housing portion 2 when viewed in the up-down direction. Also, the pair of second protruding regions 1B2 of first recessed surface 1B are disposed annularly so as to surround the entire outer peripheral edge of lower housing portion 2 when viewed in the up-down direction.

The maximum width of first recessed surface 1B in the axial direction is greater than the width of second recessed surface 2B in the axial direction at the position in the radial direction where the maximum width is measured. The maximum width of first recessed surface 1B in the axial direction is measured, for example, in a central area of first recessed surface 1B in the radial direction. The maximum width of first recessed surface 1B in the axial direction is equal, for example, to maximum width r1 of first surface 1A in the axial direction. The difference between the maximum width of first recessed surface 1B in the axial direction and the width of second recessed surface 2B in the axial direction at the position in the radial direction where the maximum width is measured is equal, for example, to the above-mentioned difference between maximum width r1 and width r2.

Figure 4:
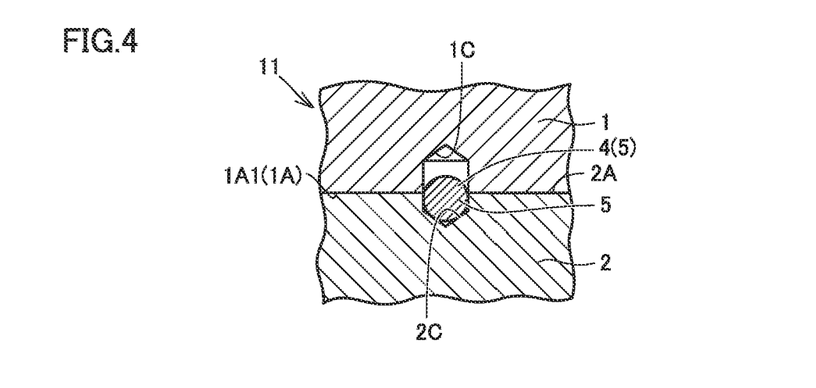
FIG. 4 is a cross-sectional view taken along an arrow IV-IV in FIG. 2 for illustrating a protrusion and a recess in the plummer block shown in FIGS. 1 to 3.

As shown in FIG. 4, bearing housing 11 further includes a protrusion 4 protruding upward from second surface 2A, and a first recess 1C recessed relative to first surface 1A and fitted to protrusion 4. Protrusion 4 and first recess 1C constitute a positioning member that is used to determine the relative position between first surface 1A and second surface 2A when upper housing portion 1 and lower housing portion 2 are assembled into bearing housing 11. Protrusion 4 and first recess 1C act as a knock ball-type positioning member. Protrusion 4 is a part of a spherical member 5, for example. A part of spherical member 5 protrudes as protrusion 4 upward with respect to second surface 2A and is fitted into first recess 1C. A remaining part of spherical member 5 is embedded in lower housing portion 2 and fixed to lower housing portion 2. Lower housing portion 2 is provided with a second recess 2C recessed relative to second surface 2A. The remaining part of protrusion 4 is fitted into second recess 2C. As shown in FIGS. 1 and 2, protrusion 4 is disposed, for example, in the vicinity of each of the plurality of fixing portions 3.

The bottom surface of each of first recess 1C and second recess 2C is a conical surface, for example. The side surface of each of first recess 1C and second recess 2C is a cylindrical surface, for example. Protrusion 4 is in contact, for example, with the cylindrical surface of first recess 1C. The remaining part of spherical member 5 is in contact, for example, with each of the conical surface and the cylindrical surface of second recess 2C.

Each of seal members 13 is provided to seal the space between through hole 12 of bearing housing 11 and the rotational shaft passing through the through hole 12. Each of seal members 13 is disposed in the vicinity of each of both ends of through hole 12 in the axial direction. Specifically, each of seal members 13 is disposed in the vicinity of each of both ends in the axial direction of each of facing region 1B1 of first recessed surface 1B and second recessed surface 2B. Specifically, the plurality of seal members 13 are disposed axially inside second protruding region 1B2 of first recessed surface 1B in the axial direction. A part of each second protruding region 1B2 and a part of first protruding region 1A2 contiguous in the radial direction to each second protruding region 1B2 are disposed axially outside each seal member 13.

The plurality of seal members 13 shown in FIG. 3 constitute what is called a labyrinth seal. A plurality of annular grooves extending in the circumferential direction around central axis line O are provided at intervals in the axial direction to be located in the vicinity of each of both ends in the axial direction of each of facing region 1B1 of first recessed surface 1B and second recessed surface 2B. Each of seal members 13 is fitted into the respective annular grooves.

<Modifications>

Figure 5:
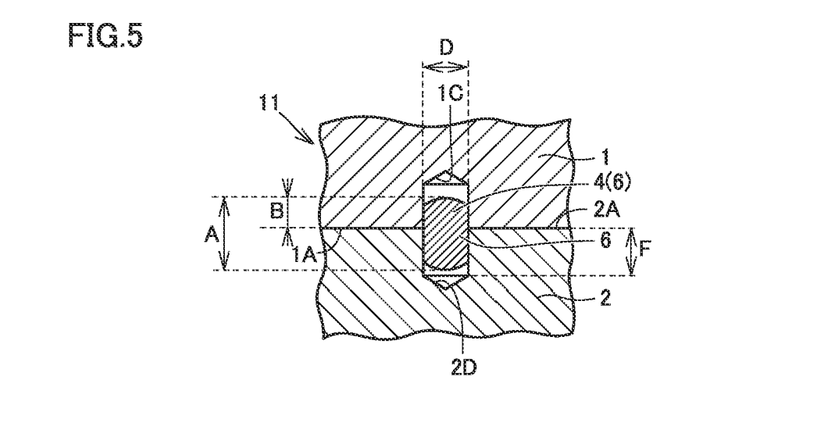
FIG. 5 is a cross-sectional view for illustrating a modification of the protrusion and the recess in the plummer block shown in FIG. 4.

As shown in FIG. 5, protrusion 4 may be configured as a part of a rod-shaped member 6. In this case, first recess 1C is fitted to a part of rod-shaped member 6. Protrusion 4 and first recess 1C act as a knock pin-type positioning member.

A remaining part of rod-shaped member 6 is embedded in lower housing portion 2. Lower housing portion 2 is provided with a third recess 2D in which the remaining part of rod-shaped member 6 is fitted. The bottom surface of third recess 2D is a conical surface, for example. The side surface of third recess 2D is a cylindrical surface, for example. The remaining part of rod-shaped member 6 may be in contact at least with the cylindrical surface of third recess 2D. The remaining part of rod-shaped member 6 may not be in contact, for example, with the conical surface of third recess 2D. Rod-shaped member 6 is a cylindrical member, for example. Rod-shaped member 6 is, for example, circular in outer shape along a cross section perpendicular to the up-down direction.

An outer diameter D of rod-shaped member 6 along the cross section perpendicular to the up-down direction and a total length A of rod-shaped member 6 in the up-down direction satisfy a relational expression of $1.5\,D \le A \le 2.5\,D$. The percentage of the ratio B/A of length B of protrusion 4 in the up-down direction to total length A is 22% or more and 28% or less. The percentage of the ratio F/A of a maximum depth F of the cylindrical surface to total length A is 70% or more and 80% or less.

First protruding region 1A2 may protrude outward from contact region 1A1 at least in the radial direction when viewed in the up-down direction.

<Effects>

In plummer block 100, each of the pair of first surfaces 1A has: contact region 1A1 in contact with each of the pair of second surfaces 2A; and first protruding region 1A2 protruding outward from contact region 1A1 when viewed in the up-down direction. Maximum width R1 of first surface 1A in the radial direction is greater than width R2 of second surface 2A in the radial direction at the position in the axial direction where maximum width R is measured.

In this case, first protruding region 1A2 serves as eaves. Thus, as compared with the case where first protruding region 1A2 is not provided, liquid such as rainwater is less likely to enter the inside of bearing housing 11 from outside through the gap between first surface 1A and second surface 2A. As a result, bearing 10 accommodated in bearing housing 11 is less likely to get corroded.

In plummer block 100, the difference (R1−R2) between maximum width R1 and width R2 is 2% or more and 15% or less of maximum width R1. When the difference (R1−R2) between maximum width R1 and width R2 is 2% or more of maximum width R1, first protruding region 1A2 acts effectively as eaves. Thus, as compared with the case where the difference (R1−R2) is less than 2% of maximum width R1, liquid such as rainwater is less likely to enter the inside of bearing housing 11 from outside through the gap between first surface 1A and second surface 2A.

Further, in the case where the difference (R1−R2) between maximum width R1 and width R2 is 2% or more of maximum width R1, first protruding region 1A2 may act as a portion onto which a machine tool or a finger of an operator is put for pulling upward upper housing portion 1, for example, when bearing housing 11 is disassembled during maintenance of plummer block 100. Thereby, upper housing portion 1 can be pulled upward more readily than the case where first protruding region 1A2 is not provided and the case where the difference (R1−R2) is less than 2% of maximum width R1.

Further, in the case where the difference (R1−R2) between maximum width R1 and width R2 is 15% or less of maximum width R1, an increase in size of upper housing portion 1 is suppressed to thereby reduce the manufacturing cost, as compared with the case where the difference (R1−R2) exceeds 15% of maximum width R1. In the case where the difference (R1−R2) exceeds 15% of maximum width R1, upper housing portion 1 may interfere with fixing portion 7 when fixing lower housing portion 2 with fixing portion 7, with the result that the handleability may be impaired.

As described above, first protruding region 1A2 may be disposed outside contact region 1A1 at least in the radial direction when viewed in the up-down direction. As a comparative example, for example, in a plummer block in which a seal member is not disposed in the radial direction between the outer peripheral edge of the bearing housing and the bearing accommodated in the bearing housing and in which the first surface does not have first protruding region 1A2, rainwater may enter the inside of the bearing housing from outside through the gap between the first surface and the second surface. On the other hand, in plummer block 100, first protruding region 1A2 protruding radially outward relative to contact region 1A1 acts as eaves. Thus, even when the seal member is not disposed in the radial direction between the outer peripheral edge of bearing housing 11 and bearing 10, rainwater is less likely to enter the inside of bearing housing 11 from outside as compared with the above-described comparative example.

Preferably, first protruding region 1A2 is disposed outside contact region 1A1 in the radial direction and the axial direction. Maximum width r1 of the first surface in the axial direction is greater than width r2 of the second surface in the axial direction at the position in the radial direction where maximum width r1 is measured.

In this way, not only first protruding region 1A2 protruding radially outward relative to contact region 1A1 but also first protruding region 1A2 protruding axially outward relative to contact region 1A1 also acts as eaves. Thus, in plummer block 100, rainwater is less likely to enter the inside of bearing housing 11 from outside through the gap between second surface 2A and contact region 1A1 located outside seal member 13 in the radial direction, as compared with the plummer block in which first protruding region 1A2 is disposed outside contact region 1A1 only in the radial direction.

Preferably, the difference (R1−R2) between maximum width R1 and width R2 in the radial direction is greater than the difference (r1−r2) between maximum width r1 and width r2 in the axial direction.

Thereby, rainwater can be prevented from entering the inside of bearing housing 11 from outside while suppressing an increase in size of plummer block 100.

When viewed in the up-down direction, the outer peripheral edge of upper housing portion 1 in the axial direction serves as the outer peripheral edge of plummer block 100 in the axial direction, whereas the outer peripheral edge of upper housing portion 1 in the radial direction is disposed inside the outer peripheral edge of lower housing portion 2 in the radial direction. Thus, when maximum width R1 is equal to or less than maximum width R3 of lower housing portion 2 in the radial direction, an increase in size of plummer block 100 in the radial direction is suppressed. However, when the difference (r1−r2) in the axial direction is equal to the difference (R1−R2) in the radial direction, plummer block 100 is increased in size in the axial direction. In contrast, when the difference (r1−r2) is less than the difference (R1−R2), an increase in size of plummer block 100 in each of the radial direction and the axial direction can be suppressed.

Even when the difference (r1−r2) in the axial direction is less than the difference (R1−R2) in the radial direction, entering of rainwater in the axial direction can be suppressed also by seal member 13.

Preferably, first recessed surface 1B has: facing region 1B1 facing second recessed surface 2B; and second protruding region 1B2 protruding axially outward from facing region 1B1 when viewed in the up-down direction. Second protruding region 1B2 is contiguous to first protruding region 1A2.

In this way, since first protruding region 1A2 and second protruding region 1B2 act as eaves, rainwater is less likely to enter the inside of bearing housing 11 from outside as compared with the case where only first protruding region 1A2 acts as eaves.

In plummer block 100 as described above, when viewed in the up-down direction, the ratio L2/L1 is 0.9 or more and 1.1 or less. The ratio L2/L1 represents a ratio of the width of first protruding region 1A2 in the radial direction located on one side with respect to bearing 10 in the radial direction to the width of first protruding region 1A2 in the radial direction located on the other side with respect to bearing 10 in the radial direction. In this case, the effect achieved as the eaves by first protruding region 1A2 located on one side in the radial direction is substantially the same as the effect achieved as the eaves by first protruding region 1A2 located on the other side in the radial direction.

In plummer block 100 as described above, when viewed in the up-down direction, the ratio L4/L3 is 0.9 or more and 1.1 or less. The ratio L4/L3 represents a ratio of the width of first protruding region 1A2 or second protruding region 1B2 in the axial direction located on one side with respect to bearing 10 in the axial direction to the width of first protruding region 1A2 or second protruding region 1B2 in the axial direction located on the other side with respect to bearing 10 in the axial direction. In this case, the effect achieved as the eaves by first protruding region 1A2 or second protruding region 1B2 located on one side in the axial direction is substantially the same as the effect achieved as the eaves by first protruding region 1A2 or second protruding region 1B2 located on the other side in the axial direction.

In plummer block 100 as described above, bearing housing 11 further includes protrusion 4 protruding upward from second surface 2A, and first recess 1C recessed relative to first surface 1A and fitted to protrusion 4. Protrusion 4 is a part of spherical member 5. Such protrusion 4 and first recess 1C function as a knock ball-type positioning member. In bearing housing 11 including such a positioning member, upper housing portion 1 and lower housing portion 2 can be relatively readily assembled and disassembled as compared with the knock pin-type positioning member shown in FIG. 5. In other words, bearing housing 11 as described above allows relatively high handleability for upper housing portion 1 and lower housing portion 2. Note that the depth dimension of second recess 2C is precisely controlled based on the dimensions of spherical member 5.

On the other hand, as described in the modification, protrusion 4 may be a part of rod-shaped member 6. In this case, the depth dimension of third recess 2D into which a remaining part of rod-shaped member 6 is fitted is allowed to be relatively uneven as compared with the depth dimension of second recess 2C into which the remaining part of spherical member 5 is fitted.

In the above-described modification of plummer block 100, outer diameter D of rod-shaped member 6 along the cross section perpendicular to the up-down direction and total length A of rod-shaped member 6 in the up-down direction satisfy a relational expression of 1.5 D≤A≤2.5 D. When total length A of rod-shaped member 6 is less than 1.5 D, outer diameter D is relatively greater than total length A, which requires greater force in disassembly of bearing housing 11, with the result that the handleability may be impaired. On the other hand, when total length A of rod-shaped member 6 is greater than 2.5 D, outer diameter D is relatively less than total length A, with the result that the durability of rod-shaped member 6 may be impaired.

In the above-mentioned modification of plummer block 100, the ratio of length B of protrusion 4 in the up-down direction to total length A of rod-shaped member 6 in the up-down direction is 22% or more and 28% or less. When the ratio is less than 22%, the state of fitting between protrusion 4 and first recess 1C is readily disassembled with relatively small force. Thus, protrusion 4 and first recess 1C may not be able to sufficiently achieve the effect as a positioning member. When the ratio is greater than 28%, the handleability of bearing housing 11 may be impaired during assembly and disassembly of bearing housing 11. Further, when the ratio is greater than 28%, the ratio F/A of maximum depth F of the cylindrical surface to total length A becomes low (for example, becomes less than 70%), with the result that the durability of protrusion 4 may be impaired.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A plummer block comprising:
a bearing; and
a bearing housing that accommodates and supports the bearing, wherein
the bearing housing includes an upper housing portion and a lower housing portion that is separate from the upper housing portion,
the upper housing portion has a pair of first surfaces facing downward and located at a distance from each other in a radial direction of the bearing,
the lower housing portion has a pair of second surfaces facing upward and located at a distance from each other in the radial direction of the bearing,
each of the pair of first surfaces has:
a contact region in contact with each of the pair of second surfaces; and
a first protruding region protruding from the contact region at least outward in the radial direction of the bearing when viewed in an up-down direction which intersects with an axial direction of the bearing,
a maximum width R1 of the pair of first surfaces in the radial direction is greater than a width R2 of the pair of second surfaces in the radial direction at a position in an axial direction of the bearing where the maximum width R1 is measured, and
a difference (R1−R2) between the maximum width R1 and the width R2 is 2% or more and 15% or less of the maximum width R1.

2. The plummer block according to claim 1, wherein
when viewed in the up-down direction, the first protruding region is disposed outside the contact region in the radial direction and the axial direction, and
a maximum width r1 of the pair of first surfaces in the axial direction is greater than a width r2 of the pair of second surfaces in the axial direction at a position in the radial direction where the maximum width r1 is measured.

3. The plummer block according to claim 2, wherein
the difference (R1−R2) between the maximum width R1 and the width R2 is greater than a difference (r1−r2) between the maximum width r1 and the width r2.

4. The plummer block according to claim 3, wherein
the upper housing portion further includes a first recessed surface disposed between the pair of first surfaces in the radial direction and recessed relative to the pair of first surfaces,
the lower housing portion further includes a second recessed surface disposed between the pair of second surfaces in the radial direction and recessed relative to the pair of second surfaces,
the first recessed surface has
a facing region facing the second recessed surface, and
a second protruding region protruding outward in the axial direction from the facing region when viewed in the up-down direction, and
the second protruding region is contiguous to the first protruding region.

5. The plummer block according to claim 2, wherein
the upper housing portion further includes a first recessed surface disposed between the pair of first surfaces in the radial direction and recessed relative to the pair of first surfaces,
the lower housing portion further includes a second recessed surface disposed between the pair of second surfaces in the radial direction and recessed relative to the pair of second surfaces,
the first recessed surface has
a facing region facing the second recessed surface, and
a second protruding region protruding outward in the axial direction from the facing region when viewed in the up-down direction, and
the second protruding region is contiguous to the first protruding region.

6. The plummer block according to claim 1, wherein
the upper housing portion further includes a first recessed surface disposed between the pair of first surfaces in the radial direction and recessed relative to the pair of first surfaces,
the lower housing portion further includes a second recessed surface disposed between the pair of second surfaces in the radial direction and recessed relative to the pair of second surfaces,
the first recessed surface has
a facing region facing the second recessed surface, and
a second protruding region protruding outward in the axial direction from the facing region when viewed in the up-down direction, and
the second protruding region is contiguous to the first protruding region.

7. The plummer block according to claim 1, wherein
when viewed in the up-down direction,
a width of the first protruding region in the radial direction located on one side with respect to the bearing in the radial direction is defined as a width L1, a width of the first protruding region in the radial direction located on the other side with respect to the bearing in the radial direction is defined as a width L2, and a ratio of the width L2 to the width L1 is 0.9 or more and 1.1 or less.

8. The plummer block according to claim 7, wherein the upper housing portion further includes a first recessed surface disposed between the pair of first surfaces in the radial direction and recessed relative to the pair of first surfaces, the lower housing portion further includes a second recessed surface disposed between the pair of second surfaces in the radial direction and recessed relative to the pair of second surfaces, the first recessed surface has a facing region facing the second recessed surface, and a second protruding region protruding outward in the axial direction from the facing region when viewed in the up-down direction, and the second protruding region is contiguous to the first protruding region.

9. The plummer block according to claim 1, wherein when viewed in the up-down direction, a width of the first protruding region in the axial direction located on one side with respect to the bearing in the axial direction is defined as a width L3, a width of the first protruding region in the axial direction located on the other side with respect to the bearing in the axial direction is defined as a width L4, and a ratio of the width L4 to the width L3 is 0.9 or more and 1.1 or less.

10. The plummer block according to claim 9, wherein the upper housing portion further includes a first recessed surface disposed between the pair of first surfaces in the radial direction and recessed relative to the pair of first surfaces, the lower housing portion further includes a second recessed surface disposed between the pair of second surfaces in the radial direction and recessed relative to the pair of second surfaces, the first recessed surface has a facing region facing the second recessed surface, and a second protruding region protruding outward in the axial direction from the facing region when viewed in the up-down direction, and the second protruding region is contiguous to the first protruding region.

11. The plummer block according to claim 1, wherein the bearing housing further includes a protrusion protruding in the up-down direction from one pair of the pair of first surfaces and the pair of second surfaces, and a recess recessed relative to the other pair of the pair of first surfaces and the pair of second surfaces and fitted to the protrusion, and the protrusion is a part of a spherical member.

12. The plummer block according to claim 11, wherein the upper housing portion further includes a first recessed surface disposed between the pair of first surfaces in the radial direction and recessed relative to the pair of first surfaces, the lower housing portion further includes a second recessed surface disposed between the pair of second surfaces in the radial direction and recessed relative to the pair of second surfaces, the first recessed surface has a facing region facing the second recessed surface, and a second protruding region protruding outward in the axial direction from the facing region when viewed in the up-down direction, and the second protruding region is contiguous to the first protruding region.

13. The plummer block according to claim 1, wherein the bearing housing further includes a protrusion protruding in the up-down direction from one pair of the pair of first surfaces and the pair of second surfaces, and a recess recessed relative to the other pair of the pair of first surfaces and the pair of second surfaces and fitted to the protrusion, and the protrusion is a part of a rod-shaped member.

14. The plummer block according to claim 13, wherein the upper housing portion further includes a first recessed surface disposed between the pair of first surfaces in the radial direction and recessed relative to the pair of first surfaces, the lower housing portion further includes a second recessed surface disposed between the pair of second surfaces in the radial direction and recessed relative to the pair of second surfaces, the first recessed surface has a facing region facing the second recessed surface, and a second protruding region protruding outward in the axial direction from the facing region when viewed in the up-down direction, and the second protruding region is contiguous to the first protruding region.

15. The plummer block according to claim 13, wherein a remaining part of the rod-shaped member is embedded in the upper housing portion or the lower housing portion, an outer shape of the rod-shaped member along a cross section perpendicular to the up-down direction is circular, and an outer diameter D of the rod-shaped member along the cross section and a total length A of the rod-shaped member in the up-down direction satisfy a relational expression of $1.5D \leq A \leq 2.5D$.

16. The plummer block according to claim 15, wherein the upper housing portion further includes a first recessed surface disposed between the pair of first surfaces in the radial direction and recessed relative to the pair of first surfaces, the lower housing portion further includes a second recessed surface disposed between the pair of second surfaces in the radial direction and recessed relative to the pair of second surfaces, the first recessed surface has a facing region facing the second recessed surface, and a second protruding region protruding outward in the axial direction from the facing region when viewed in the up-down direction, and the second protruding region is contiguous to the first protruding region.

17. The plummer block according to claim 15, wherein a total length of the rod-shaped member in the up-down direction is defined as a total length A, a length of the protrusion in the up-down direction is defined as a length B, and a ratio of the length B to the total length A is 22% or more and 28% or less.

18. The plummer block according to claim 17, wherein
the upper housing portion further includes a first recessed surface disposed between the pair of first surfaces in the radial direction and recessed relative to the pair of first surfaces,
the lower housing portion further includes a second recessed surface disposed between the pair of second surfaces in the radial direction and recessed relative to the pair of second surfaces,
the first recessed surface has
a facing region facing the second recessed surface, and
a second protruding region protruding outward in the axial direction from the facing region when viewed in the up-down direction, and
the second protruding region is contiguous to the first protruding region.

* * * * *